United States Patent
Kang

(10) Patent No.: US 7,596,106 B2
(45) Date of Patent: Sep. 29, 2009

(54) SYSTEM AND METHOD FOR GENERATING FLEXIBLE TIME SLOT IN INTERNAL VOICE MAIL SYSTEM

(75) Inventor: Byung-Dong Kang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 430 days.

(21) Appl. No.: 11/653,246

(22) Filed: Jan. 16, 2007

(65) Prior Publication Data

US 2007/0165550 A1  Jul. 19, 2007

(30) Foreign Application Priority Data

Jan. 16, 2006  (KR) ...................... 10-2006-0004587

(51) Int. Cl.
H04J 3/00 (2006.01)
H04L 5/14 (2006.01)
H03K 7/02 (2006.01)

(52) U.S. Cl. ........................ 370/280; 370/294; 370/498; 375/353

(58) Field of Classification Search ................. 370/280, 370/294, 321, 437, 463–465, 498, 503, 533; 375/220, 353–355; 455/450–453, 509–510
See application file for complete search history.

(56) References Cited

U.S. PATENT DOCUMENTS 3,660,606 A * 5/1972 De Witt ....................... 370/299
7,324,558 B2 * 1/2008 Schaller ....................... 370/503
2008/0253404 A1 * 10/2008 Lampin et al. .............. 370/498

\* cited by examiner

*Primary Examiner*—Tri H Phan
(74) *Attorney, Agent, or Firm*—Robert E. Bushnell, Esq.

(57) ABSTRACT

A system and method for generating a flexible time slot in an internal voice mail system, the system includes: a first counter/time slot playback device operating as a counter in response to a system synchronization signal and outputting at least one time slot (TS) signal; a second counter/time slot playback device operating as a counter in response to the system synchronization signal and outputting at least one time slot (TS_n) signal; a transmit start of transfer (TSX) channel synchronization generator generating a proper TSX channel synchronization signal in response to channel information data transmitted from the voice mail system; and a flexible TSX generator outputting a TSX signal corresponding to a channel synchronization data value selected and transmitted by the TSX channel synchronization generator after synthesizing the signals output from the first counter/time slot playback device and the second counter/time slot playback device and generating at least one synchronized TSX signal.

14 Claims, 5 Drawing Sheets

SYSTEM AND METHOD FOR GENERATING FLEXIBLE TIME SLOT IN INTERNAL VOICE MAIL SYSTEM

CLAIM OF PRIORITY

This application makes reference to, incorporates the same herein, and claims all benefits accruing under 35 U.S.C. § 119 from an application for FLEXIBLE TIME SLOT GENERATING SYSTEM AND METHOD IN INTERNAL VOICE MAIL SYSTEM earlier filed in the Korean Intellectual Property Office on 16 Jan. 2006 and there duly assigned Serial No. 10-2006-0004587.

BACKGROUND OF THE INVENTION

1. Field of the Invention

The present invention relates to a system and method for generating a flexible time slot in an internal voice mail system.

2. Description of the Related Art

A private branch exchange (PBX) is a telephone exchange system for all employees to share a specific number of external telephone lines used in a company and for automatically connecting telephones of internal users connected to extensions. And, a keyphone system is switch and connection equipment that can accept one or more office lines and one or more extensions, and can switch and connect a channel between an office line and an extension using a telephone.

In particular, types of circuit switching include space-division circuit switching used in an analog switch, and time-division circuit switching used in a digital switch. In addition, there is a method of switching between a space-division speech path of which a switch is set up into a matrix to select a channel, and a time-division speech path that transmits a time-division-multiplexed input signal to an output line when a time position is changed.

The time-division speech path method uses a plurality of channels through one transmission line. Such a method dividing time and thereby multiplexing one transmission line is referred to as time-division multiplexing (TDM), the transmission line is referred to as a highway, and a time position of each channel in the highway is referred to as a time slot.

Therefore, when a signal of each channel is transmitted to the highway in digital signal format, time-division-multiplexed digital information divided into time slots for each channel is decoded in an output side highway to obtain an analog signal and thereby carry out communication. A time-division switching method is performed according to this principle.

A pulse code modulation (PCM) highway is used in an internal voice mail system, etc., of a PBX or a keyphone system described above, and a time slot assignment signal used for enabling the PCM highway is fixed.

Since the time slot assignment signal is fixed by integrated circuits (ICs) (U14 and U8), there is insufficient ability to cope with variation in a number of ports of a voice mail system or a low-capacity keyphone system.

For example, even when a transmit start of transfer (TSX) signal of a two- or four-channel unit is needed, an eight-channel unit is used, wastefully. In addition, when eight channels or more are needed, an additional IC must be used for every eight channels, as described above.

Therefore, the conventional art does not possess flexible functionality and has limitations with respect to cost, packaging degree, and so on, when the number of channels increases.

SUMMARY OF THE INVENTION

It is an objective of the present invention to provide a system and method for generating a flexible time slot in an internal voice mail system, whereby a time slot assignment signal used for enabling a pulse code modulation (PCM) highway employed in a private branch exchange (PBX), an internal voice mail apparatus of a keyphone system, etc., is generated according to a flexible, not fixed, method.

According to an aspect of the present invention, there is provided a system for generating a flexible time slot in an internal voice mail system, comprising: a first counter/time slot playback device operating as a counter in response to a system synchronization signal and outputting at least one time slot (TS) signal; a second counter/time slot playback device operating as a counter in response to the system synchronization signal and outputting at least one time slot (TS_n) signal; a transmit start of transfer (TSX) channel synchronization generator generating a proper TSX channel synchronization signal in response to channel information data transmitted from the internal voice mail system; and a flexible TSX generator, after synthesizing the signals input from the first counter/time slot playback device and the second counter/time slot playback device and generating at least one synchronized TSX signal, outputting a TSX signal corresponding to a channel synchronization data value selected and transmitted by the TSX channel synchronization generator.

The flexible time slot generation system may further comprise a highway buffer enabling a highway of the corresponding channel in response to the TSX signal output from the flexible TSX generator.

The first counter/time slot playback device may generate thirty-two TS signals (TS[31:0]) in response to at least one clock signal input from the internal voice mail system.

The second counter/time slot playback device may generate thirty-two TS_n signals (TS_n[31:0]) in response to at least one clock signal input from the internal voice mail system.

The signals output from the first counter/time slot playback device and the second counter/time slot playback device may have a signal difference as large as a transmit frame synchronization (BFSX) signal pulse width.

The TSX channel synchronization generator may randomly select the channel synchronization data value and assign an order of a time slot according to the selected channel synchronization data value.

When the time slot (TS) signal output from the first counter/time slot playback device and the time slot (TS_n) signal output from the second counter/time slot playback device all are high, the flexible TSX generator may output the TSX signal of a time slot corresponding to the assigned order in a low level.

According to another aspect of the present invention, there is provided a method for generating a flexible time slot in an internal voice mail system, comprising the steps of: operating as a counter in response to a system synchronization signal and outputting at least one time slot (TS) signal; operating as a counter in response to the system synchronization signal and outputting at least one time slot (TS_n) signal; synthesizing the at least one time slot signal (TS) and the at least one time slot signal (TS_n) and generating at least one synchronized TSX signal; selecting an arbitrary TSX channel synchronization signal in response to channel information data transmitted from the system; and outputting a TSX signal corresponding to the selected TSX channel synchronization signal among the at least one synchronized TSX signal.

The method may further comprise the step of enabling a highway of the corresponding channel in response to the output TSX signal.

In the step of operating as a counter in response to the system synchronization signal and outputting at least one time slot (TS) signal, thirty-two time slot (TS) signals (TS [31:0]) may be output in response to at least one clock signal input from the system.

In the step of operating as a counter in response to the system synchronization signal and outputting at least one time slot (TS_n) signal, thirty-two time slot (TS_n) signals (TS[31:0]) may be output in response to at least one clock signal input from the system.

The time slot (TS) signal and the time slot (TS_n) signal may have a signal difference as large as a BFSX signal pulse width.

In the step of selecting an arbitrary TSX channel synchronization signal in response to channel information data transmitted from the system, the channel synchronization data value may be randomly selected and an order assigned to a time slot according to the selected channel synchronization data value.

When the output time slot (TS) signal and the output time slot (TS_n) signal all are high, a TSX signal of the assigned time slot may be output with a low level.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF EXEMPLARY EMBODIMENTS

Hereinafter, exemplary embodiments of the present invention will be described in detail with reference to the accompanying drawings. In the following description, a detailed description of known functions and configurations incorporated herein has been omitted for conciseness.

Figure 1:
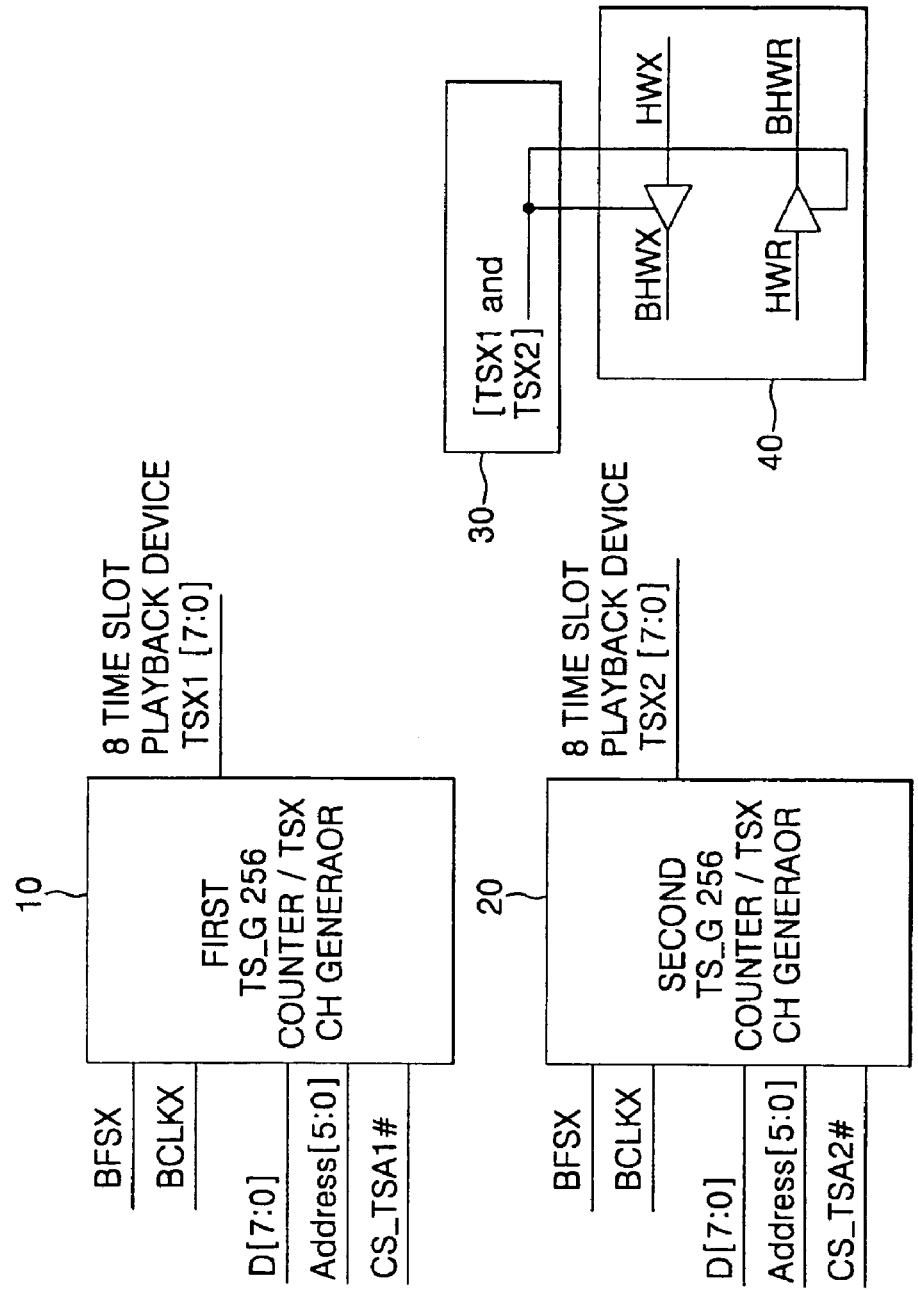
FIG. 1 is a block diagram of a system for generating a time slot in a conventional internal voice mail system.

FIG. 1 is a block diagram of a system for generating a time slot in a conventional internal voice mail system.

As illustrated in FIG. 1, a first 256 counter/Transmit Start of Transfer (TSX) time slot generator (TS_G Counter/TSX channel (CH) generator) 10 internally operates as a 256 counter in response to clock signals, i.e., a system-synchronized clock transmit frame synchronization (BFSX) signal and a transmit reference clock (BCLKX) signal, applied from the internal voice mail system, thereby outputting eight time slot assignment signals TSX1[7:0] synchronized with the BFSX. Here, D[7:0] denotes data buses of 0 to 7, Address[5:0] denotes addresses of 5 to 0, and CS_TSA1# denotes a chip enable signal.

In addition, a second 256 counter/TSX time slot generator (TS_G Counter/TSX CH generator) 20 also internally operates as a 256 counter in response to the clock signals, i.e., system-synchronized clock BFSX signal and BCLKX signal, applied from the internal voice mail system, thereby outputting eight time slot assignment signals TSX2[7:0] synchronized with the BFSX. Here, D[7:0] denotes data buses of 0 to 7, Address[5:0] denotes addresses of 5 to 0, and CS_TSA2# denotes a chip enable signal.

The eight time slot assignment signals TSX1[7:0] output from the first 256 counter/TSX time slot generator 10 and the eight time slot assignment signals TSX2[7:0] output from the second 256 counter/TSX time slot generator 20 are logically multiplied (AND operation) by an AND gate circuit 30, and sixteen channel assignment signals are output to a highway buffer 40.

Hereupon, the highway buffer 40 transmits and receives a pulse code modulation (PCM) highway signal (BHWX and BHWR, respectively) in response to the sixteen channel assignment signals TSX1 and TSX2. Signal definitions: HWX (PCM data Highway transmit signal): Serial data transmit output; HWR (PCM data Highway receive signal): Serial data receive input; BHWX (Buffered PCM data Highway transmit signal); and BHRX (Buffered PCM data Highway receive signal).

Figure 2:
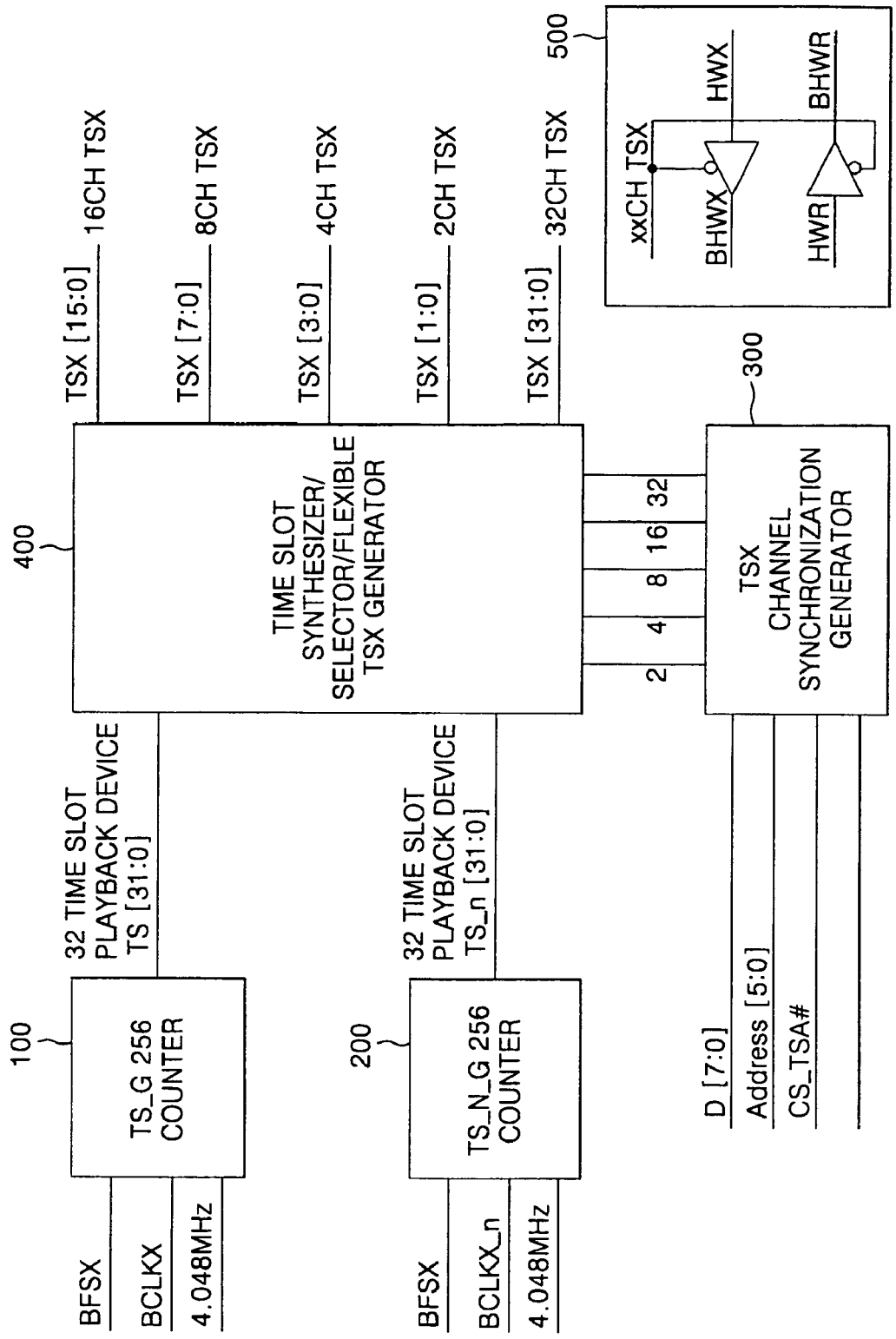
FIG. 2 is a block diagram of a system for generating a flexible time slot in an internal voice mail system according to an exemplary embodiment of the present invention.

FIG. 2 is a block diagram of a system for generating a flexible time slot in an internal voice mail system according to an exemplary embodiment of the present invention.

As illustrated in FIG. 2, the flexible time slot generation system of the present invention comprises a 256 counter/ 32CH time slot playback device (TS_G 256 counter) 100, a 256 counter/32CH time slot playback device (TS_N_G 256 counter) 200, a TSX channel synchronization generator 300, a time slot synthesizer/selector/flexible TSX generator 400, and a PCM TSX enable buffer 500.

The 256 counter/32CH time slot playback device (TS_G 256 counter) 100 internally operates as a base-256 notation counter in response to a signal, i.e., system-synchronized clock BFSX signal, BCLKX signal, and 4.048 MHz signal, applied from the internal voice mail system, thereby outputting time slots TS[31:0] of thirty-two channels synchronized with the BFSX to the time slot synthesizer/selector/flexible TSX generator 400.

The 256 counter/32CH time slot playback device (TS_N_G 256 Counter) 200 also internally operates as a base-256 notation counter in response to a signal, i.e., system-synchronized clock BFSX signal, BCLKX_n signal, and 4.048 MHz signal, applied from the internal voice mail system, and thereby outputting time slots TS_n[31:0] of thirty-two channels synchronized with the BFSX to the time slot synthesizer/selector/flexible TSX generator 400.

Here, signal outputs of the 256 counter/32CH time slot playback device (TS_G 256 counter) 100 and the 256 counter/32CH time slot playback device (TS_N_G 256 counter) 200 have a signal difference as large as a BFSX signal pulse width.

The TSX channel synchronization generator 300 generates a proper TSX CH synchronization signal in response to channel information data transmitted from the internal voice mail system. Here, D[7:0] denotes data buses of 0 to 7, Address[5:0] denotes addresses of 5 to 0, and CS_TSA# denotes a chip enable signal.

In other words, the TSX channel synchronization generator 300 outputs a TSX CH synchronization signal of 2CH, 4CH, 8CH, 16CH and 32CH units in response to the channel information data transmitted from the internal voice mail system to the time slot synthesizer/selector/flexible TSX generator 400.

The time slot synthesizer/selector/flexible TSX generator 400 synthesizes signals input from the 256 counter/32CH time slot playback device (TS_G 256 counter) 100 and the 256 counter/32CH time slot playback device (TS_N_G 256 counter) 200, generates a synchronized TSX signal (time slot assignment signal) of thirty-two channels, and outputs a TSX signal selected by the TSX channel synchronization generator 300.

For example, the time slot synthesizer/selector/flexible TSX generator 400 outputs a 2CH TSX signal having time slots TS[1:0] of two channels when the TSX CH synchronization signal selected by the TSX channel synchronization generator 300 is a TSX CH synchronization signal of two (2) channel units, outputs a 4CH TSX signal having time slots TS[3:0] of four channels when a TSX CH synchronization signal of four (4) channel units is selected, and outputs a 8CH TSX signal having time slots TS[7:0] of eight channels when a TSX CH synchronization signal of eight (8) channel units is selected.

And, the time slot synthesizer/selector/flexible TSX generator 400 outputs a 16CH TSX signal having time slots TS[15:0] of sixteen channels when a TSX CH synchronization signal of sixteen (16) channel units is selected, and outputs a 32CH TSX signal having time slots TS[31:0] of thirty-two channels when a TSX CH synchronization signal of thirty-two (32) channel units is selected.

The PCM TSX enable (highway) buffer 500 operates the corresponding highway to be enabled in response to a CH TSX signal output from the time slot synthesizer/selector/flexible TSX generator 400.

As described above, the present invention allows channel units of a TSX signal to be flexibly used according to necessity using a TSX channel synchronization generator of a single integrated circuit (IC) (complex programmable logic device (CPLD)) which is a kind of IC logic device and can have a program recorded therein. Thus, it is possible to provide flexible functionality while reducing cost and increasing packaging degree in the same printed circuit board (PCB).

Figure 3:
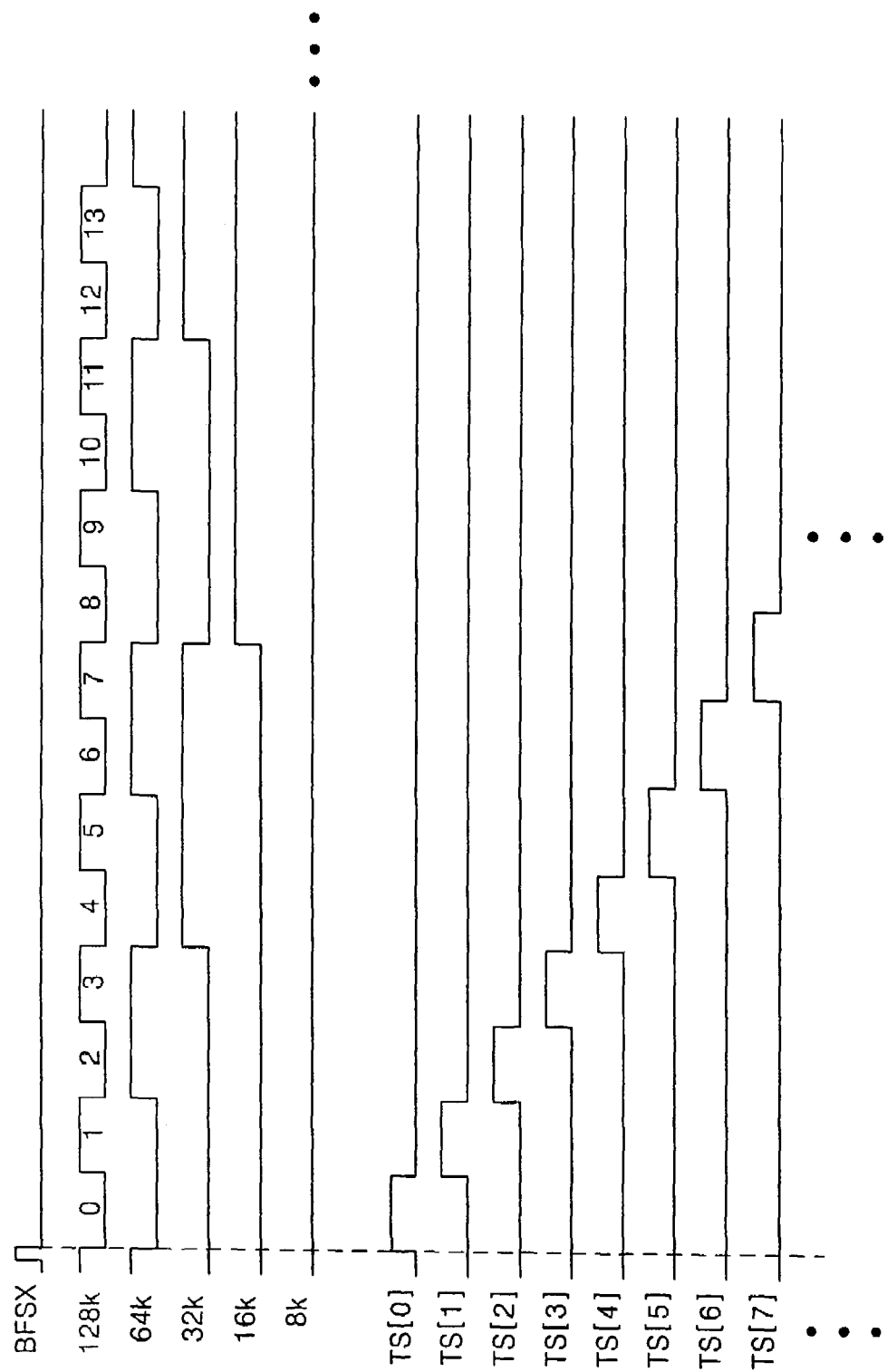
FIG. 3 is a timing diagram showing an example of time slot generation in a TS_G 256 counter of FIG. 2.

FIG. 3 is a timing diagram showing an example of time slot generation in the TS_G 256 counter 100 shown in FIG. 2.

As illustrated in FIG. 3, the TS_G 256 counter 100 receives an input BFSX signal having a period of 8 k and five clock signals (128 k, 64 k, 32 k, 16 k and 8 k), and outputs thirty-two time slot (TS) (TS[0] to TS[31]) signals.

More specifically, the TS_G 256 counter 100 generates the thirty-two TS signals TS[31:0] using five output signals of, e.g., slot 0 TS[0] to slot 4 TS[4] and TS[31] given below.
TS[0]=/128k*/64k*/32k*/16k*/8k
TS[1]=128k*/64k*/32k*/16k*/8k
TS[2]=/128k*64k*/32k*/16k*/8k
TS[3]=128k*64k*/32k*/16k*/8k
TS[4]=/128k*/64k*32k*/16k*/8k
...
TS[31]=128k*64k*32k*16k*8k Here, the right side of the above equations for TS[0] to TS[4] can be represented with the help of switching algebra. For example, the equation for TS [0] means that the output of a logic gate (such as a NAND gate circuit) becomes "1" when inputs of the five clocks 128k, 64k, 32k, 16k and 8k are "0,0,0,0,0", and the equation for TS[1] means that the output of the logic gate becomes "1" when inputs of the five clocks 128k, 64k, 32k, 16k and 8k are "1,0,0,0,0".

Figure 4:
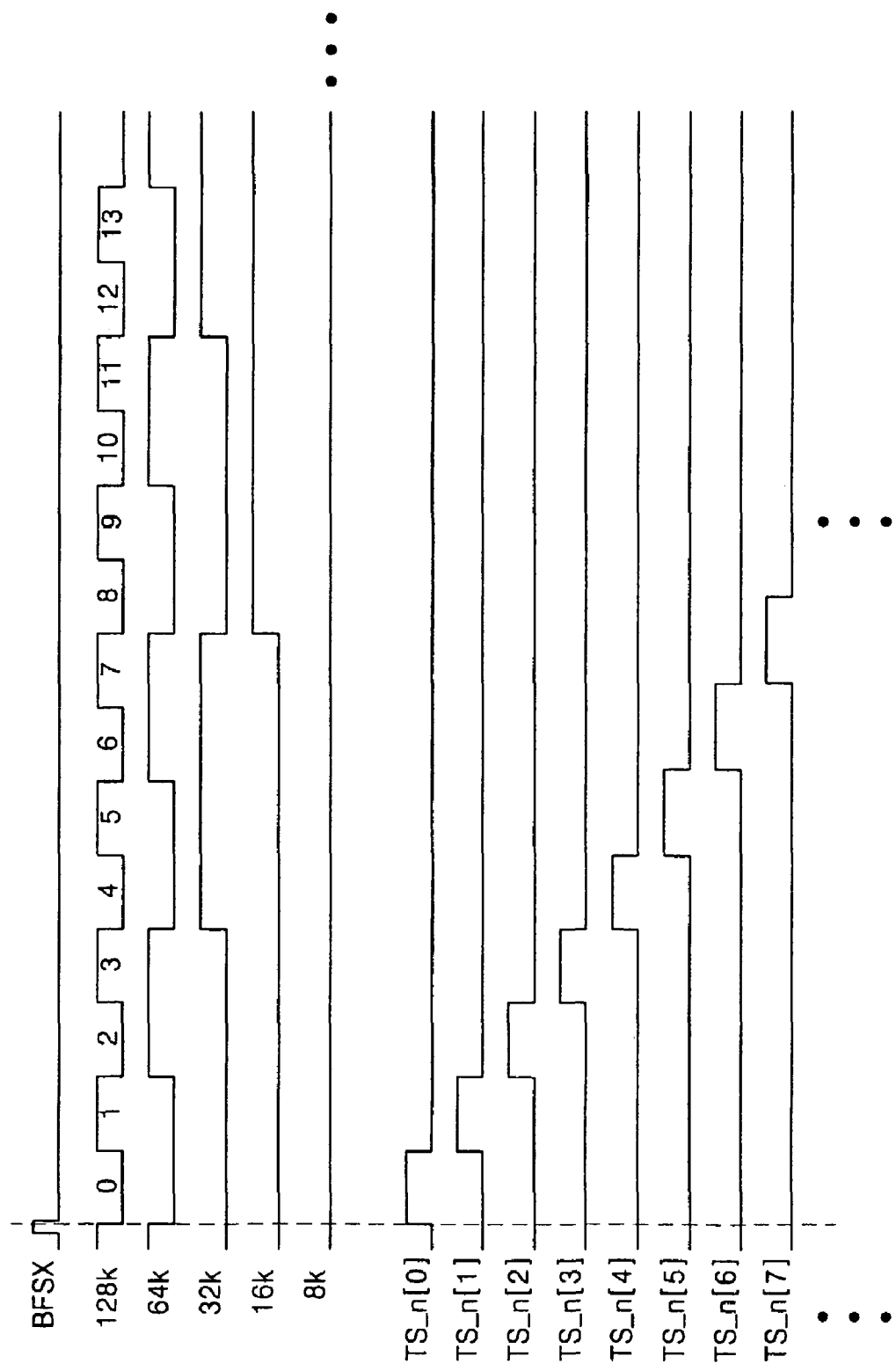
FIG. 4 is a timing diagram showing an example of time slot generation in a TS_N_G 256 counter of FIG. 2.

FIG. 4 is a timing diagram showing an example of time slot generation in the TS_N_G 256 counter 200 shown in FIG. 2.

As illustrated in FIG. 4, the TS_N_G 256 counter 200 receives an input BFSX signal having a period of 8 k and five clock (128 k, 64 k, 32 k, 16 k and 8 k) signals, and outputs thirty-two time slot (TS_n) signals TS_n[0] to TS_n[31].

More specifically, the TS_N_G 256 counter generates the thirty-two TS signals TS[31:0] using five output signals of, e.g., slot 0 TS[0] to slot 4 TS[4] and TS[31] given below.
TS_n[0]=/128k*/64k*/32k*/16k*/8k
TS_n[1]=128k*/64k*/32k*/16k*/8k
TS_n[2]=/128k*64k*/32k*/16k*/8k
TS_n[3]=128k*64k*/32k*/16k*/8k
TS_n[4]=/128k*/64k*32k*/16k*/8k
...
TS_n[31]=128k*64k*32k*16k*8k The right side of the above equations for TS_n[0] to TS_n[4] can be represented with the help of switching algebra. For example, the equation for TS_n[0] means that the output of a logic gate (such as a NAND gate circuit) becomes "1" when inputs of the five clocks 128k, 64k, 32k, 16k and 8k are "0,0,0,0,0", and the equation for TS_n[1] means that the output of the logic gate becomes "1" when inputs of the five clocks 128k, 64k, 32k, 16k and 8k are "1,0,0,0,0".

Figure 5:
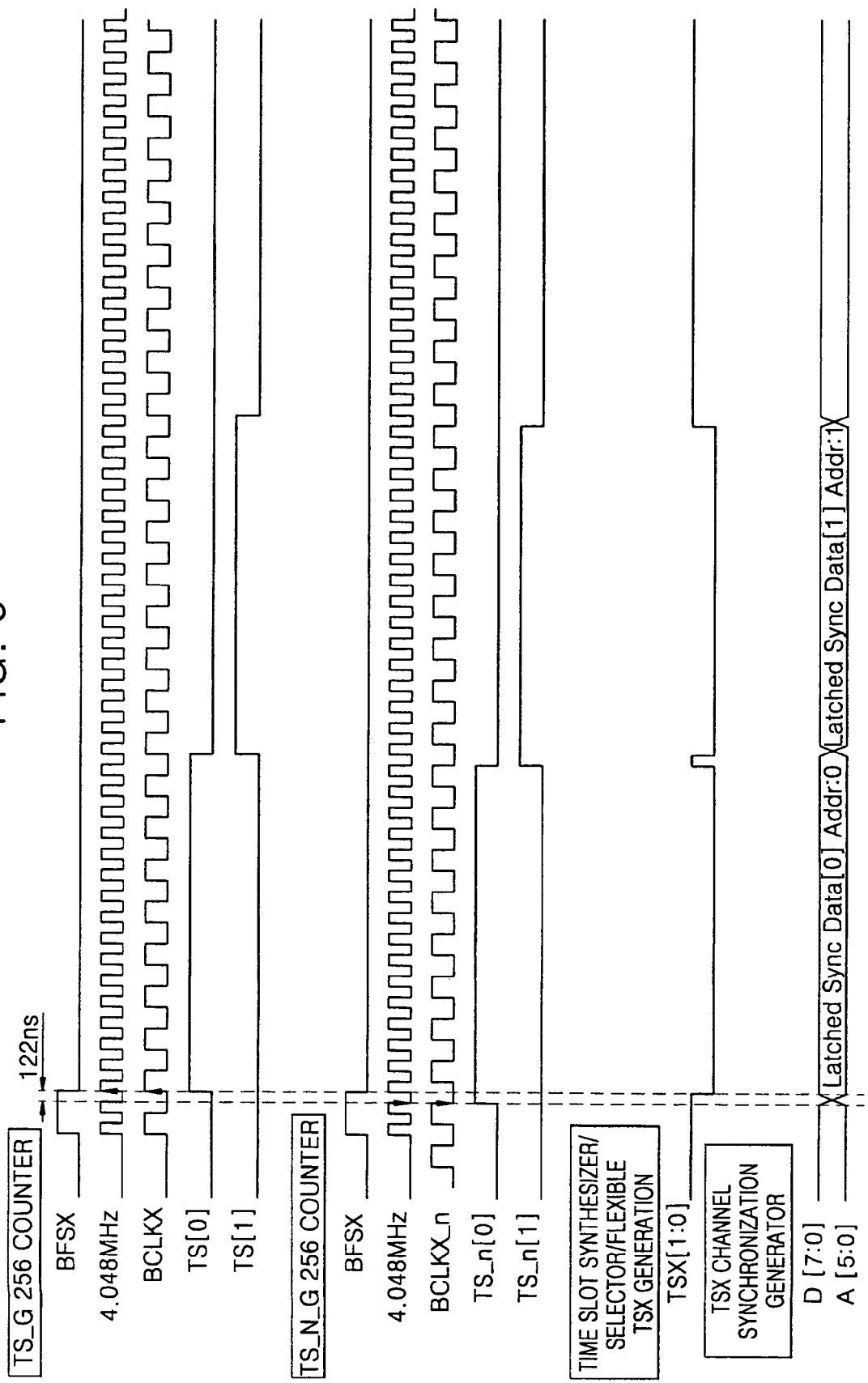
FIG. 5 is a timing diagram showing 2-channel (2CH)/ virtual protocol machine (VPM) transmit start of transfer (TSX) signal generation according to the present invention.

FIG. 5 is a timing diagram showing an example of 2CH TSX signal generation according to the present invention, in which a 2CH TSX signal is generated for time slots TS[1:0] of two (2) channels from the time slot synthesizer/selector/flexible TSX generator 400.

As illustrated in FIG. 5, when a TSX CH synchronization signal selected by the TSX channel synchronization generator 300 is a TSX CH synchronization signal of two (2) channel units, a 2CH TSX signal having time slots TS[1:0] of two channels is generated from the time slot synthesizer/selector/flexible TSX generator 400.

First, referring to the timing diagram of the TS_G 256 Counter 100 the TS_G 256 Counter 100 internally operates as a 256 counter in response to signals, i.e., system-synchronized clock BFSX signal, BCLKX signal, and 4.048 MHz signal, applied from the internal voice mail system, thereby outputting time slots TS[31:0] of thirty-two channels synchronized with the BFSX to the time slot synthesizer/selector/flexible TSX generator 400.

In addition, referring to the timing diagram of the TS_N_G 256 Counter 200 the TS_N_G 256 Counter 200 internally operates as a 256 counter in response to signals, i.e., system-synchronized clock BFSX signal, BCLKX_n signal which is an inverted BCLKX signal, and 4.048 MHz signal, applied from the internal voice mail system, thereby outputting time slots TS_n[31:0] of thirty-two channels synchronized with the BFSX to the time slot synthesizer/selector/flexible TSX generator 400.

Here, signal outputs of the TS_G 256 counter 100 and the TS_N_G 256 counter 200 have a signal difference as large as a BFSX signal pulse width.

Subsequently, the TSX channel synchronization generator 300 generates a proper TSX CH synchronization signal in response to channel information data transmitted from the internal voice mail system. For example, when a TSX CH synchronization signal of two channel units is selected while data buses are D[7:0] and addresses are A[5:0], synchronized data 0 latched at address 0 is assigned to slot 0 and synchronized data 1 latched at address 1 is assigned to slot 1.

Accordingly, the time slot synthesizer/selector/flexible TSX generator 400 outputs a TSX[1:0] signal of two channels in response to the TSX CH synchronization signal of two channel units selected by the TSX channel synchronization generator 300. Here, the TSX[1:0] signal is output in a low level only when both a TS signal and a TS_n signal are logic high.

According to the present invention, a TSX channel synchronization generator allows a TSX signal to flexibly use a channel unit according to necessity using a single IC (CPLD). Thus it is possible to provide flexible functionality while reducing cost and increasing packaging degree.

While the present invention has been described with reference to exemplary embodiments thereof, it will be understood by those skilled in the art that various changes in from and detail may be made therein without departing from the scope of the present invention as defined by the following claims.

What is claimed is:

1. A system for generating a flexible time slot in an internal voice mail system, comprising:
   a first counter/time slot playback device operating as a counter in response to a system synchronization signal and outputting at least one time slot (TS) signal;
   a second counter/time slot playback device operating as a counter in response to the system synchronization signal and outputting at least one time slot (TS_n) signal;
   a transmit start of transfer (TSX) channel synchronization generator generating a proper TSX channel synchronization signal in response to channel information data transmitted from the internal voice mail system; and
   a flexible TSX generator, after synthesizing the signals input from the first counter/time slot playback device and the second counter/time slot playback device and generating at least one synthesized TSX signal, outputting a TSX signal corresponding to a TSX channel synchronization signal generated by the TSX channel synchronization generator.

2. The system of claim 1, further comprising a highway buffer enabling a highway of a corresponding channel in response to the TSX signal output from the flexible TSX generator.

3. The system of claim 1, wherein the first counter/time slot playback device generates thirty-two TS signals TS[31:0] in response to at least one clock signal input from the internal voice mail system.

4. The system of claim 1, wherein the second counter/time slot playback device generates thirty-two TS_n signals TS_n[31:0] in response to at least one clock signal input from the internal voice mail system.

5. The system of claim 1, wherein the signals output from the first counter/time slot playback device and the second counter/time slot playback device have a signal difference as large as a transmit frame synchronization (BFSX) signal pulse width.

6. The system of claim 1, wherein the TSX channel synchronization generator randomly selects the channel synchronization data value and assigns an order of a time slot according to the selected channel synchronization data value.

7. The system of claim 6, wherein the flexible TSX generator outputs the TSX signal of a time slot corresponding to the assigned order in a low level when the time slot TS signal output from the first counter/time slot playback device and the time slot TS_n signal output from the second counter/time slot playback device are all high.

8. A method for generating a flexible time slot in an internal voice mail system, comprising the steps of:
   operating as a counter in response to a system synchronization signal and outputting at least one time slot (TS) signal;
   operating as a counter in response to the system synchronization signal and outputting at least one time slot (TS_n) signal;
   synthesizing the at least one time slot (TS) signal and the at lest one time slot (TS_n) signal and generating at least one synchronized transmit start of transfer (TSX) signal;
   selecting an arbitrary TSX channel synchronization signal in response to channel information data transmitted from the system; and
   outputting a TSX signal corresponding to the selected TSX channel synchronization signal among the at least one synchronized TSX signal.

9. The method of claim 8, further comprising the step of enabling a highway of a corresponding channel in response to the output TSX signal.

10. The method of claim 8, wherein in the step of generating at least one first time slot (TS) signal, thirty-two first time slot (TS) signals TS[31:0] are output in response to at least one clock signal input from the voice mail system.

11. The method of claim 8, wherein in the step of generating at least one second time slot (TS_n) signal, thirty-two second time slot (TS_n) signals TS_n[31:0] are output in response to at least one clock signal input from the system.

12. The method of claim 8, wherein the first time slot (TS) signal and the second time slot (TS_n) signal have a signal difference as large as a transmit frame synchronization (BFSX) signal pulse width.

13. The method of claim 8, wherein in the step of generating TSX channel synchronization signals, and selecting one of said TSX channel synchronization signals in response to channel information data transmitted from the voice mail system, the channel information data value is selected and an order is assigned to a time slot according to the channel information data.

14. The method of claim 13, wherein the TSX signal of a time slot corresponding to the assigned order is output with a low level when the first time slot (TS) signal and the second time slot (TS_n) signal are both high.

* * * * *